W. H. STEWART.
Kitchen-Cabinet.

No. 209,936. Patented Nov. 12, 1878.

Attest:
H. L. Perrie
G. W. Hooper.

Inventor:
W. H. Stewart
By Frank Cross Somes
Atty.

2 Sheets—Sheet 2.

W. H. STEWART.
Kitchen-Cabinet.

No. 209,936. Patented Nov. 12, 1878.

Attest:
H. L. Perrine
G. M. Cooper

Inventor:
W. H. Stewart
By Frank Chase Somes
Atty.

N. PETERS, PHOTO-LITHOGRAPHER, WASHINGTON, D. C.

UNITED STATES PATENT OFFICE.

WILLIAM H. STEWART, OF BUTLER, MISSOURI.

IMPROVEMENT IN KITCHEN-CABINETS.

Specification forming part of Letters Patent No. 209,936, dated November 12, 1878; application filed September 16, 1878.

*To all whom it may concern:*

Be it known that I, WILLIAM H. STEWART, of Butler, in the county of Bates and State of Missouri, have invented certain new and useful Improvements in Kitchen-Cabinets; and I do hereby declare that the following is a full, clear, and exact description thereof, which will enable others skilled in the art to which it appertains to make and use the same, reference being had to the accompanying drawings, and to letters of reference marked thereon, which form a part of this specification.

The invention relates to a kitchen-cabinet containing within itself, in a compact and convenient form for use, secluded from ants, flies, and other insects, various ingredients and utensils used in bread and cake making.

The main object of the invention is to prevent the seclusion and breeding of insects within the structure.

It is well-known that insects seek the darkness, and avoid those places where light and air are freely admitted. In those kitchen-cabinets where the supporting-frame of the receptacles containing flour, sugar, and other food materials is made solid, forming a casing inclosing said receptacles, great facility is afforded in the dark nooks and corners thus formed for the housing of insects, and for their multiplication and development. In order to avoid this, I place the series of adjustable food-receptacles in a skeleton-frame, which is open at the sides and bottom to the light and air. The receptacles are freely removable from the frame at will, and may thus be readily cleaned in every part, both outside and in, and insects are prevented from finding a lodgment in any part of the structure.

The invention consists in the peculiar construction and arrangement of parts, hereinafter described and distinctly claimed.

Figure 1:
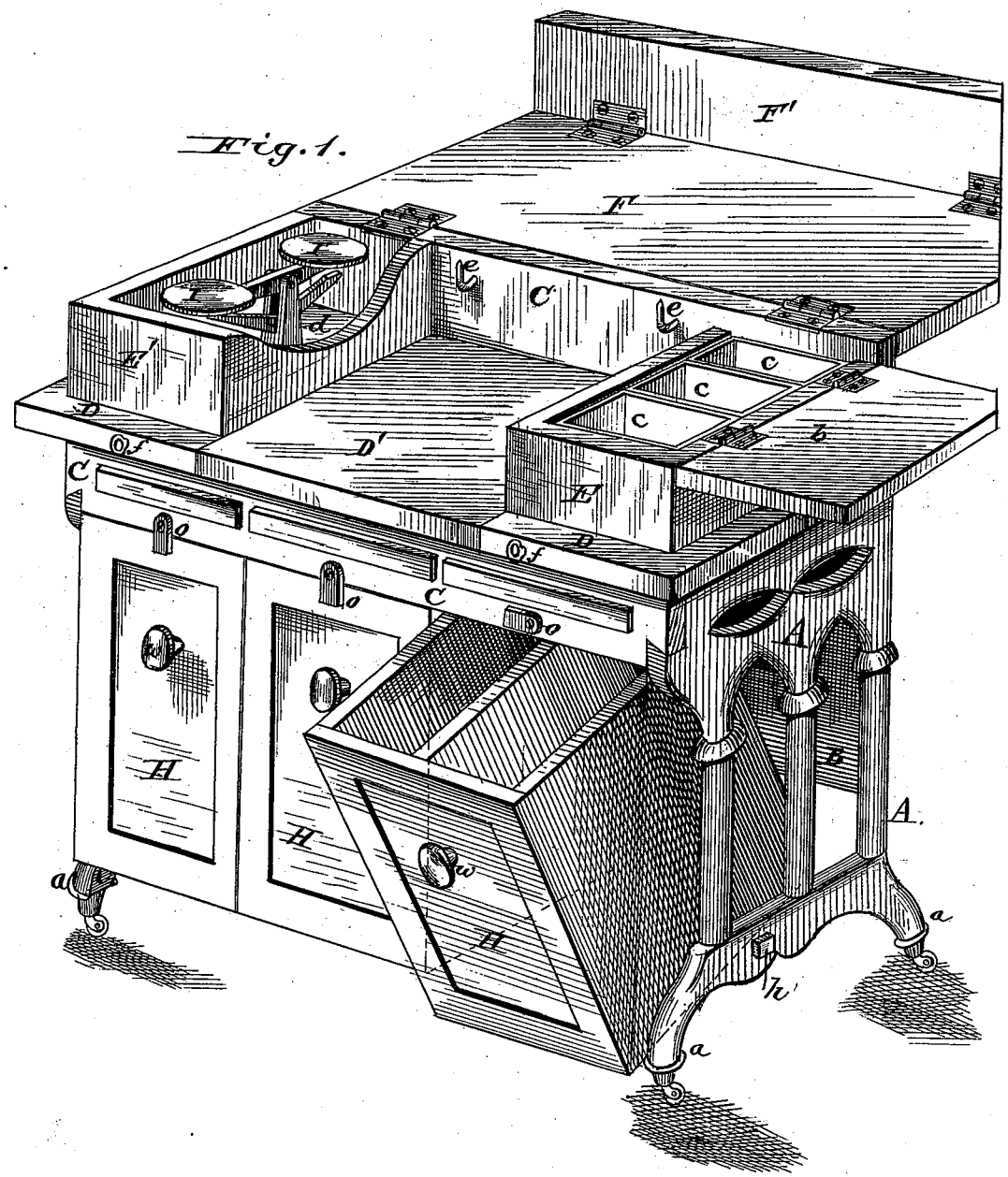
Figure 2:
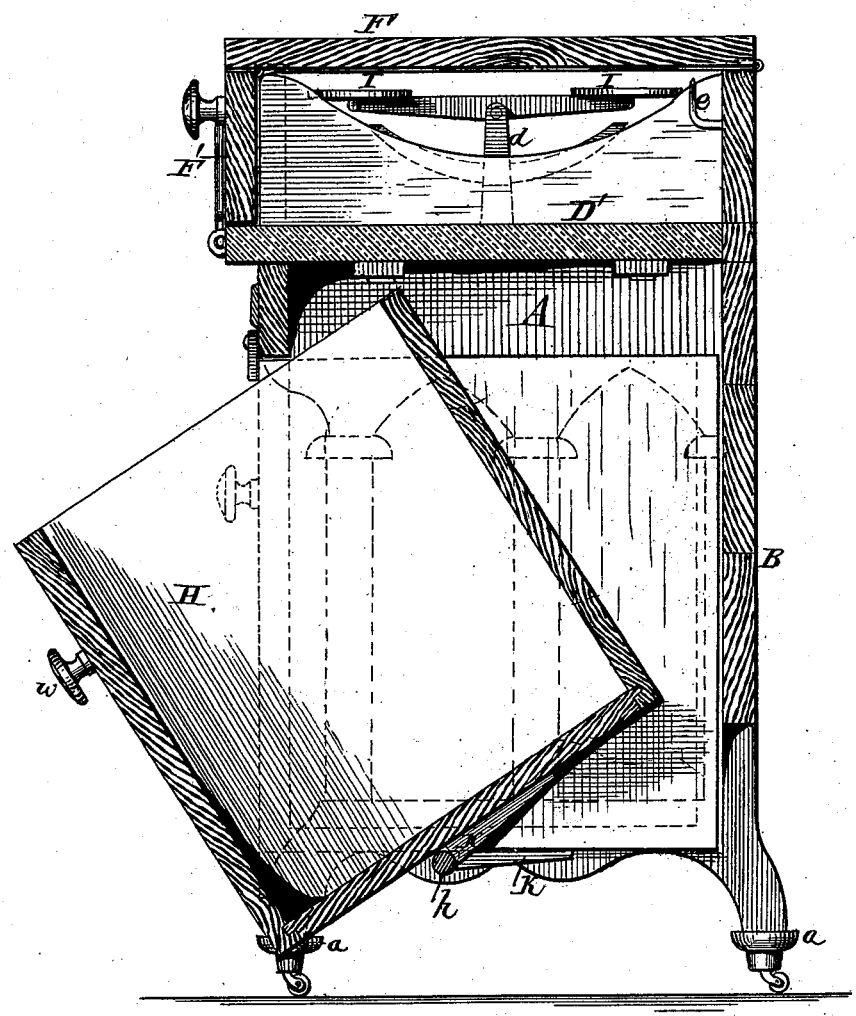

Figure 1 is a perspective view of this kitchen-cabinet, showing the top lid open and one of the lower boxes open. Fig. 2 is a transverse section through the center.

A in the drawings represents a skeleton cast-iron frame, consisting, essentially, of two end frames, mounted on casters, and supporting the structure, being connected by a longitudinal rod, $h$. The legs, a short distance above the casters, are provided with insect-cups $a$, in which kerosene-oil, chalk, or other ingredient obnoxious to insects is placed.

As thus constructed the frame presents an attractive appearance, and is open to the light and air. It is thus free from dark nooks and corners favorable for the housing and breeding of insects. Each end piece A is screwed or otherwise fastened to the top or tabular wooden portion above. The rear side is boarded down at B a portion of the distance from the top, to form a backing and rest for the removable boxes which are interposed between the end frames. A longitudinal bar, C, extends along the front of the structure near the top, and, being connected to the end pieces A, forms a part of the frame of the structure. Resting on the top of the frame thus constructed is a tabular slab, D, the central portion, D', of which forms the kneading-table. This portion D' may be covered with zinc, or may consist of or be covered with a marble slab. On the top of the table D are compartments E E', extending transversely across each end. The compartment E is provided with a hinged lid, $b$, and with small removable boxes $c$, for containing spices, salt, and other articles. The compartment E' contains a weighing scale or balance, I, the support $d$ of which is permanently fastened to the bottom of the compartment.

A guard, C, is provided at the back, rising flush with the tops of the boxes E E', and forming the ends thereof. Hooks $e\,e$ are provided therein, for the convenient hanging of the rolling-pin, or other utensils or articles.

The whole top of the structure is closed by the hinged lid F. This cover or lid is provided with a hinged flange, F', which shuts over the front ends of the boxes E E', and makes flush with the front edge of the table D D'. This flange is provided with hasps, which hook into eyes $f\,f$ on said front edge.

When the lid F is closed the scale-compartment and the working space between the boxes E E' are completely shut in.

As will be seen, it is not necessary in order to close the structure to remove the articles from the knead-board, as is the case when the latter is made to draw out and shove in through a slot in the case. This is of especial advantage when the operator is suddenly called to other duties and is compelled to suspend for a time her operations on the knead-board.

In the body of the structure, underneath the table, is arranged a series of boxes for containing flour, meal, sugar, bread, and such like articles. These boxes are simply adjusted to their places in the structure, each independently of the others, and so arranged that they can be readily removed bodily from the frame for the purpose of cleaning. When access to their contents is desired they are simply tilted forward.

An iron rod, $h$, extends longitudinally between the end frames A, near the bottom of the structure, having its ends resting in said frame. On this rod the several boxes H rest, as shown in Fig. 2. This forms a very simple construction, no transverse rails or rockers being required on the boxes or frame, a cleat, $k$, on the bottom of the boxes being all that is necessary. The rod $h$ is shown as placed a little forward of the center line, in order that the weight of the box and contents may tend to hold it closed. These boxes are provided with knobs $w$ on the front side, whereby they are swung or tilted downward, for opening or backward for closing. Buttons $o$ on the case fasten them in place when they are closed. When open they are held in place by the rear portion of the top coming in contact with the bar C. When closed the upper portion of the back of the boxes rests against the back B of the case. One or more of the boxes may be divided into two or more compartments, if desired, as shown in Fig. 1.

When it is desired to remove the boxes from the case they are tilted forward a short distance, and then the rear portion is raised sufficiently to allow the cleat $k$ to pass over the rod $h$.

When the top lid F is closed it forms a flat top, and the structure may be used as a stand for buckets or other articles.

What is claimed as the invention is—

1. A kitchen-cabinet provided with a skeleton-frame open at the sides and bottom, said frame consisting of skeleton end frames, connected at the bottom by a longitudinal rod, a partially-closed back, a box for containing sugar, flour, or other food or food materials, adjusted upon and supported by said rod, and arranged to tilt downward or upward to open or close, said box being provided on its bottom with means for retaining it in place on the rod, and being freely removable from the frame at will, and a suitable fastening for said box when closed, substantially as described.

2. A kitchen-cabinet consisting, essentially, of a tabular top, a supporting skeleton-frame open at the sides and bottom, said frame consisting of skeleton end frames, connected at the bottom by a longitudinal rod, a partially-closed back, and a series of food-receptacles underneath said top, adjusted upon and supported by said rod, and arranged to tilt downward or upward to open or close, the several boxes provided with means for retaining them in place on the rod, being independent of each other and separately removable from the structure at will, substantially as described.

In testimony that I claim the foregoing as my own I affix my signature in presence of two witnesses.

WILLIAM H. STEWART.

Witnesses:
  A. L. STONE,
  JOHN B. ELLIS.